Aug. 28, 1962  S. W. KNIGHT  3,051,298
DRIVE AND REVERSING MECHANISM FOR ENDLESS CONVEYORS
Filed April 22, 1960  2 Sheets-Sheet 1
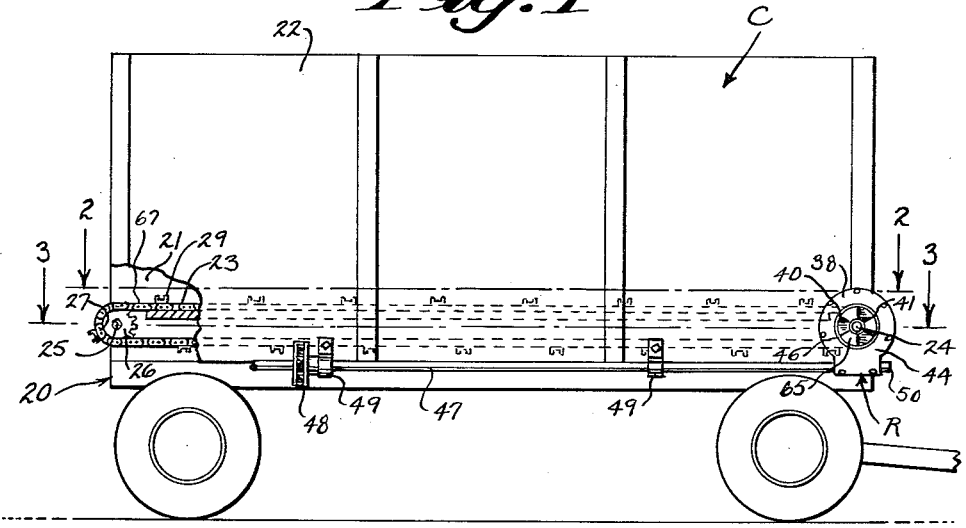
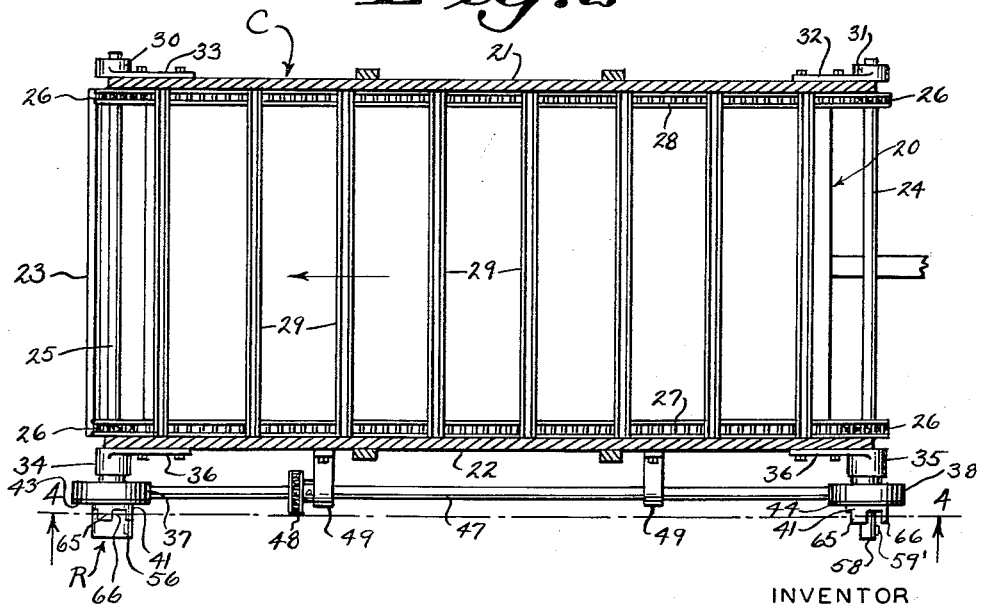
INVENTOR
STANLEY W. KNIGHT
BY
*Wright Wright*
ATTORNEYS Aug. 28, 1962  S. W. KNIGHT  3,051,298
DRIVE AND REVERSING MECHANISM FOR ENDLESS CONVEYORS
Filed April 22, 1960  2 Sheets-Sheet 2
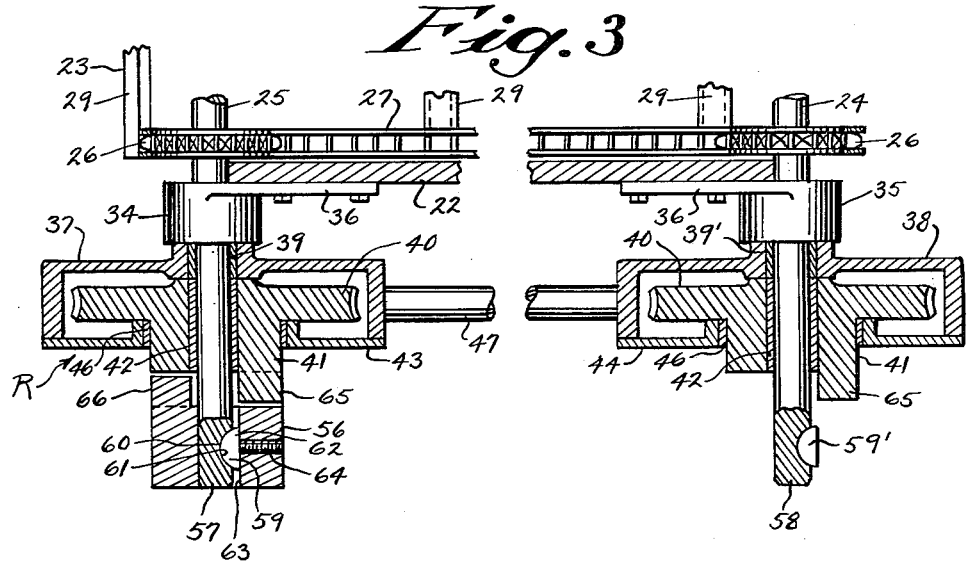
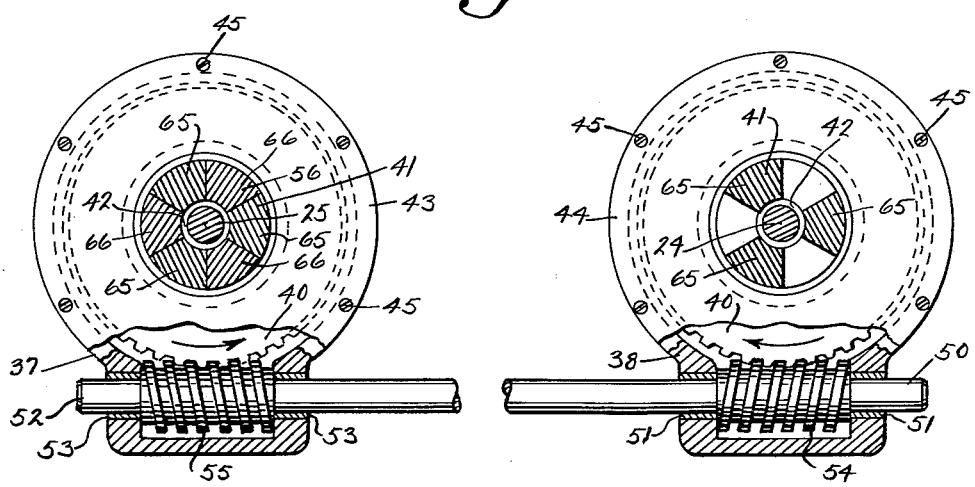
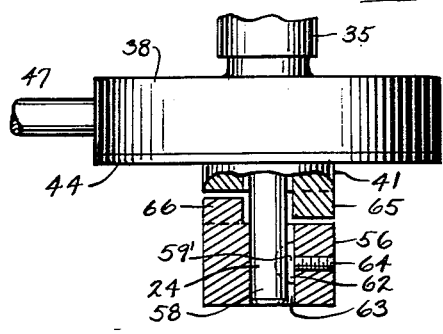
INVENTOR
STANLEY W. KNIGHT
BY *Wright Wright*
ATTORNEYS

United States Patent Office 3,051,298
Patented Aug. 28, 1962

3,051,298
DRIVE AND REVERSING MECHANISM FOR ENDLESS CONVEYORS
Stanley W. Knight, Brodhead, Wis.
Filed Apr. 22, 1960, Ser. No. 23,940
4 Claims. (Cl. 198—203)

This invention appertains to farm machinery, such as cattle feeders, bunk feeders, loaders and unloaders, and more particularly to a novel reversing mechanism for the chain conveyors usually incorporated in such machinery.

In the above-mentioned types of machinery and particularly in cattle feeders, the box or wagon portion is provided with a chain conveyor for moving the material to the beaters, which beaters usually feed the material into the troughs or into position for the cattle. It would be advantageous to utilize this cattle feeder for other than delivering feed to the animals and in order to adapt this feeder to other uses, it would be desirable to be able to reverse the drive of the chain conveyor. Attempts have been made in the past to provide reversing mechanism for the chain conveyor but these types of reversing mechanisms have been too complicated and expensive and thus overcome the advantages.

It is therefore, a primary object of my present invention to provide a novel reversing mechanism which is economical to manufacture and easy to operate.

Another important object of my present invention is to provide a new and novel drive and reversing mechanism for the apron travel of a chain conveyor.

Still another object of my invention is to provide a cattle or bunk feeder in which the direction of travel of the chain conveyor can be reversed or changed as desired.

A further object of my invention is to provide a new and improved reversing means for a chain conveyor of the type having a driven gear for each shaft, by providing a novel removable clutch hub or reversing jaw which can be placed alternately on one shaft or the other to provide a drive connection with the gear in the proper direction.

A salient feature of my invention resides in providing a chain conveyor having a shaft at each end about which the conveyor chains are trained and providing novel means whereby only one shaft may be driven at a time, each shaft giving a different direction of travel to the conveyor.

A more specific object of my present invention is to provide two shafts for the conveyor, each shaft being freely rotatable in its gear casing, a gear wheel for each shaft freely rotatable on its respective shaft, means for driving each gear wheel in the opposite direction one from the other and a novel clutch or reversing jaw for alternately connecting one shaft with its respective gear wheel as desired.

Another object of my invention is to provide each gear wheel with a toothed hub and to provide a novel mating toothed clutch hub or reversible jaw, which may be keyed to one shaft or the other, as desired.

An important object of my present invention resides in providing two driven shafts at either end of a conveyor about which the conveyor chains are trained, so that one shaft or the other may be alternately driven to change the direction of travel of the conveyor, but so that the top stretch of the conveyor is always pulled in its direction of travel rather than pushed.

A further object of my invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts, hereinafter more fully described, illustrated and claimed.

A preferred and practical embodiment of my invention is shown in the accompanying drawings, in which:

FIGURE 1 is a side elevational view of a cattle or bunk feeder provided with my novel and improved reversing mechanism, certain parts being broken away and in section to further illustrate details in construction;

FIGURE 2 is a horizontal section taken through the cattle feeder and showing in top plan, the novel construction of my reversing mechanism, the section being represented by the line 2—2 of FIGURE 1, of the drawings and looking in the direction of the arrows;

FIGURE 3 is an enlarged fragmentary horizontal section taken through my novel reversing mechanism, the section being represented by the line 3—3 of FIGURE 1, of the drawings, looking in the direction of the arrows;

FIGURE 4 is a fragmentary vertical section on the same scale as FIGURE 3, the section being represented by the line 4—4 of FIGURE 2 of the drawings, looking in the direction of the arrows, and with certain parts being broken away and in section to further illustrate specific structural details, and FIGURE 5 is a fragmentary top plan view of the right hand drive means showing my novel clutch hub or reversing jaw in operative position to change the direction of drive from that illustrated in FIGURES 1 to 4, inclusive, with parts being broken away and in section.

Referring now to the drawings in detail, wherein similar reference characters designate corresponding parts throughout the several views, the letter R generally indicates my new and improved drive and reversing mechanism and the same is shown associated with a standard type cattle or bunk feeder C.

The specific construction of the cattle bunk feeder C forms no particular part of my present invention and it may be of any standard type now on the market, but for purposes of description, the same includes a body or frame 20 and vertical side members 21 and 22 respectively. The bunk feeder may or may not be open at both ends, but as shown, this type is not provided with the end walls. Further, the wagon or box C is provided with the usual endless conveyor or apron 23 and this conveyor is trained about front and rear shafts 24 and 25, respectively. Keyed to each shaft is a pair of sprockets 26 and the chains 27 and 28 are trained about their respective sprockets. The conveyor or apron 23 is also provided with the usual spaced channel iron apron slats 29, and in the usual construction the shafts 24 and 25 are rotatably received in bearing hubs 30 and 31 respectively and these hubs are in turn bolted or secured to the side of the wagon by means of the brackets 32 and 33, as shown. The other ends of the shafts are received in the hubs 34 and 35 respectively, which are secured by the brackets 36 to the side of the wagon, as shown. The description so far is one usual manner for rotatably mounting the conveyor or apron to the wagon or box C and the apron is usually in turn driven in one direction by any standard type of power available. As previously mentioned, it is desirable in order to use the wagon C for other than a bunk feeder to be able to reverse the drive or travel of the conveyor or apron, and while complicated reversing mechanisms have been provided in the past, there have been serious disadvantages which far outweigh the advantages. Two of the disadvantages are as follows: In the usual construction only one shaft 24 or 25 would be the driven shaft and when the direction of travel of that shaft is reversed, the conveyor would be pushed instead of pulled, and therefore, the upper flight when reversed would sag and not function properly, and second, the fact that the reversing mechainsm was expensive and complicated, did not warrant providing the conveyor with said mechanism.

In my present invention I form the gear case housings 37 and 38, respectively, integral with the hubs 34 and 35, and the shafts 24 and 25 are freely rotatable in the bearings or bushings 39 and 39', and further it should be noted that each shaft extends considerably beyond the end termination of the gear housings 37 and 38.

Mounted on each shaft and freely rotatable thereon is a gear wheel 40 and these gear wheels 40 are identically formed and are each provided with an outwardly extending integral toothed hub portion 41. I also provide a bearing or bushing 42 for each gear 40 to insure the fact that it will be freely rotatable in respect to its shaft. The gear casings 37 and 38 are then provided with covers 43 and 44 respectively, and these covers are secured by utilizing metal screws or bolts 45, as shown. I also provide a bearing or bushing 46 between the cover portion and the hub portion 41 of each gear wheel 40. In order to rotate or drive each gear wheel 40, I provide a common drive shaft 47 and this drive shaft may be driven in any manner and as shown is provided with a sprocket wheel 48 keyed thereto and driven by a standard power takeoff (not shown). This drive shaft 47 is supported in the bearings 49 so that it will be freely rotatable therein. The forward end 50 of the shaft 47 is received in the forward gear casing 38 and is freely rotatable in respect thereto by means of the bearings or bushings 51. The rear end portion 52 of the shaft is rotatably carried by the gear casing 37 and is also provided with the bearings or bushings 53, as shown. Keyed or otherwise secured to the shaft 47 for rotation therewith is a forward worm gear 54 and the rear worm gear 55. The rear worm gear 55 is constructed and arranged so as to rotate the rear gear wheel 40 in the direction of the arrows, FIG. 4 of the drawings and the forward worm gear 54 rotates the forward gear wheel 40 in the opposite direction as indicated by the arrows in FIG. 4.

In order to obtain a drive between a gear wheel 40 and its respective shaft 24 or 25, I provide a novel clutch toothed hub or reversing jaw 56 and this jaw is so constructed as to be keyed to the outer end 57 or 58 of either shaft. Obviously, any known manner of removably keying the hub or reversing jaw 56 to its shaft ends may be utilized, but for purposes of description I provide two keys 59 and 59' and the rounded end 60 of the key 59 is received in the arcuate slot 61 formed in the end 57 of shaft 25 andt he upper flat surface 62 of the key is slidably received in the slot 63 provided in my novel clutch hub or reversing jaw 56. I also provide an identical key 59' which is likewise pressed into the end 58 of shaft 24. I may also provide a set screw 64 which may be tightened against the key to prevent the removal of the novel reversing jaw 56 during the operation of the device. In actual practice, I may provide a flattened portion adjacent the end of each shaft and the set screw can be tightened against this portion.

It should be here mentioned that the novel toothed hub 41 of the gear wheels 40 may be provided with any number of teeth but I have shown three relatively large triangular shaped teeth 65 and obviously my novel reversing jaw 56 is provided with three mating and similarly shaped teeth 66. With my novel reversing jaw 56 in the position illustrated in FIGURES 1 to 4, inclusive, a drive connection from the source of power will be through shaft 47, worm gear 55, rear gear wheel 40, my novel reversing jaw 56 to rotate shaft 25 in the direction of the arrows, FIG. 4. Thus, the chain conveyor or apron 23 will be driven in the direction of the arrows, FIG. 2 of the drawings, and it should be noted that the upper flight or stretch 67 of the conveyor will be pulled toward the direction of rotation, thus assuring the fact that the upper stretch will remain straight and this is also aided by the weight of the lower stretch as the conveyor rotates. In order to reverse the direction of travel of the conveyor or apron 23, it is merely necessary to loosen the set screw 64, slide my clutched hub or reversing jaw 56 off of the shaft 25 and the key 59, slide my reversing jaw over the key 59' and its shaft 24 and retighten the set screw 64 (as shown in FIG. 5). The teeth 66 will now mate with the correspondingly formed teeth 68 of the forward gear wheel 40 and a drive will be had through shaft 47, forward worm gear 54, forward gear wheel 40, the reversing jaw 56 to drive shaft 24, in the direction of the arrow (right hand side FIG. 4), and of course reversing the direction of travel of the conveyor from the arrow indicated in FIG. 2 of the drawings, and here again, it should be noted that the upper flight 67 of the conveyor will be pulled instead of pushed, thus keeping the flight straight and assuring a steady and direct drive.

From the description above, it can be seen that I have provided a novel clutch hub and reversing jaw that gives a decided advantage over other complicated and expensive reversing mechanism.

For example, I do not have to provide complex gear transmissions or gear shifting mechanism, and secondly by utilizing my novel reversing jaw the top flight of the conveyor will always be pulled and never pushed when change of direction is had.

While I have shown and described certain specific embodiments of the invention, it will be understood that these embodiments are merely for the purpose of illustration and description, that various other forms may be devised and that changes may be made in the proportions and minor details of construction without departing from the spirit of the invention, or scope of the appended claims.

I claim:

1. A drive and reversing means for endless conveyors of the type having a supporting frame and a transversely extending shaft at each end of the conveyor carried by the frame and abouut which the conveyor is trained and keyed for movement in response to the direction of rotation of said shafts comprising, a gear casing for each shaft supported by said frame, said shafts each being freely rotatable in respect to its respective casing, a gear wheel mounted on each shaft in said gear casing and freely rotatable in respect to its respective shaft and casing, means for simultaneously driving each gear wheel in an opposite direction from one another, and means including a removable toothed clutch hub and reversing jaw for alternately connecting each shaft in drive with its respective gear wheel, whereby the direction of travel of said conveyor can be changed as desired.

2. A drive and reversing means for endless conveyors of the type having a supporting frame and a transversely extending shaft at each end of the conveyor carried by the frame and about which the conveyor is trained and keyed for movement in response to the direction of rotation of said shafts comprising, a gear casing for each shaft supported by said frame, said shafts each being freely rotatable in respect to its respective casing, a gear wheel mounted on each shaft in said gear casing and freely rotatable in respect to its respective shaft and casing, means for simultaneously driving each gear wheel in an opposite direction from one another, a longitudinally extending driven shaft supported by said frame, a worm gear keyed to said longitudinally extending shaft within each gear casing in drive connection with its respective gear wheel, one worm gear driving its respective gear wheel in a direction opposite from said other gear wheel, and means including a removable toothed clutch hub and reversing jaw for alternately connecting each shaft in drive with its respective gear wheel, whereby the direction of travel of said conveyor can be changed as desired and whereby said conveyor apron is always pulled in its direction of travel to maintain a tight upper stretch.

3. In a cattle and bunk feeder, a drive and reversing means for the conveyor apron comprising, a pair of transversely extending shafts rotatably mounted in said feeder adjacent a respective end thereof and about which the conveyor apron is trained for rotation, a gear wheel mounted on each shaft at one end thereof and freely rotatable in respect thereto, means for simultaneously driving each gear wheel in a direction opposite from one another, and means including a removable clutch hub and reversing jaw for alternately connecting a respective shaft in drive with its respective gear wheel, whereby the direction of travel of said conveyor apron can be reversed as desired and whereby said apron conveyor is always pulled in its direction of travel to maintain a tight upper stretch.

4. A drive and reversing means for endless conveyors of the type having a supporting frame and a transversely extending shaft at each end of the conveyor carried by the frame and about which the conveyor is trained and keyed for movement in response to the direction of rotation of said shafts, comprising a gear wheel mounted on each shaft and freely rotatable in respect to its respective shaft, means for simultaneously driving each gear wheel in a direction opposite from one another, means for alternately connecting each shaft in drive with its respective gear wheel, including an outwardly extending toothed hub integral with each gear wheel, a removable clutch hub and reversing jaw adapted to interlock and mating with said outwardly extending toothed hub, said removable clutch hub and reversing jaw being manually removed and replaced alternately keying said reversing jaw to one shaft or the other to provide a drive connection with said toothed gear hub and its respective shaft.

References Cited in the file of this patent
UNITED STATES PATENTS

| | | |
|---|---|---|
| 1,697,504 | Humphreys | Jan. 1, 1929 |
| 1,945,532 | Lima | Feb. 6, 1934 |